(12) United States Patent
Kang et al.

(10) Patent No.: US 12,387,759 B2
(45) Date of Patent: Aug. 12, 2025

(54) CASSETTE STORAGE CASE AND CASSETTE MANAGEMENT SYSTEM INCLUDING THE SAME

(71) Applicant: SAMSUNG ELECTRONICS CO., LTD., Suwon-si (KR)

(72) Inventors: Seunggyu Kang, Suwon-si (KR); Hyunjae Kang, Suwon-si (KR); Sangmin Kim, Suwon-si (KR); Youngwook Kim, Suwon-si (KR); Yong-Jun Ahn, Suwon-si (KR); Min Kyun Lee, Suwon-si (KR); Sangkyung Lee, Suwon-si (KR); Hyunwoo Lee, Suwon-si (KR); Jeonghun Lim, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 67 days.

(21) Appl. No.: 18/453,090

(22) Filed: Aug. 21, 2023

(65) Prior Publication Data
US 2024/0312486 A1    Sep. 19, 2024

(30) Foreign Application Priority Data
Mar. 17, 2023 (KR) .................. 10-2023-0035188

(51) Int. Cl.
*G11B 23/023* (2006.01)

(52) U.S. Cl.
CPC ...... *G11B 23/0233* (2013.01); *G11B 2220/90* (2013.01)

(58) Field of Classification Search
CPC .......... G11B 23/0233; G11B 2220/90; G11B 23/023; B65D 21/04; B65D 21/041; B65D 21/043; B65D 21/0233
USPC ....... 206/387.1, 387.12, 723, 710, 722, 724, 206/503, 509, 505–507, 514, 515, 518, 206/519
See application file for complete search history.

(56) References Cited

U.S. PATENT DOCUMENTS

| | | | |
|---|---|---|---|
| 6,887,026 B1 | 5/2005 | Kuebart | |
| 6,899,145 B2 | 5/2005 | Aggarwal | |
| 7,344,031 B2 | 3/2008 | Hasegawa et al. | |
| 7,686,167 B1 * | 3/2010 | Stahl | B65D 21/045 206/509 |
| 8,292,077 B2 * | 10/2012 | Andersen | H01L 21/67386 206/453 |
| 9,230,844 B2 | 1/2016 | Mizokawa et al. | |
| 10,156,794 B1 | 12/2018 | Yu et al. | |

(Continued)

FOREIGN PATENT DOCUMENTS

| | | | |
|---|---|---|---|
| EP | 1189228 A2 * | 3/2002 | ........... G11B 23/023 |
| JP | H0536820 A | 2/1993 | |

(Continued)

*Primary Examiner* — Rafael A Ortiz
(74) *Attorney, Agent, or Firm* — Myers Bigel, P.A.

(57) ABSTRACT

According to an embodiment, a cassette storage case includes a body defining an internal storage space for a cassette. The body includes a lower body part, and a shield body part extending upward from an upper surface outer region of the lower body part. The shield body part has an opening in an upper portion thereof. A load protruding portion extends outward from an outer bottom surface of the lower body part, and has a shape that corresponds to a shape of the opening.

19 Claims, 20 Drawing Sheets

(56) References Cited

U.S. PATENT DOCUMENTS

| | | | |
|---|---|---|---|
| 10,504,762 B2 | 12/2019 | Parathithasan et al. | |
| 2003/0024845 A1* | 2/2003 | Smyers | B65D 21/0213 |
| | | | 206/509 |
| 2008/0296194 A1* | 12/2008 | Stahl | B65D 21/045 |
| | | | 206/518 |
| 2010/0126896 A1* | 5/2010 | Barbalho | B65D 21/046 |
| | | | 206/508 |
| 2012/0263562 A1 | 10/2012 | Mizokawa et al. | |
| 2021/0109439 A1 | 4/2021 | Eggum et al. | |
| 2023/0278191 A1* | 9/2023 | Zhang | B65D 21/0228 |
| | | | 206/503 |

FOREIGN PATENT DOCUMENTS

| | | |
|---|---|---|
| JP | H08148538 A | 6/1996 |
| JP | 5445015 B2 | 1/2014 |
| JP | 5687575 B2 | 1/2015 |
| KR | 19980016868 A | 6/1998 |
| KR | 20090084286 A | 8/2009 |
| WO | 2021072126 A1 | 4/2021 |

\* cited by examiner

CASSETTE STORAGE CASE AND CASSETTE MANAGEMENT SYSTEM INCLUDING THE SAME

CROSS-REFERENCE TO RELATED APPLICATION

This application claims priority to and the benefit of Korean Patent Application No. 10-2023-0035188 filed in the Korean Intellectual Property Office on Mar. 17, 2023, the disclosure of which is incorporated herein by reference in its entirety.

BACKGROUND OF THE INVENTION

(a) Field of the Invention

The present disclosure is related to a cassette storage case and a cassette management system including the same.

(b) Description of the Related Art

In semiconductor production facilities, cassettes are used to store wafers, reticles, etc. Many wafers and reticles are used in semiconductor production facilities, and accordingly, many cassettes storing wafers and reticles are also used in semiconductor production facilities.

When these cassettes are loaded in a flat space, spatial utility is very low. To solve this problem, stokers, structures including metal beam structures, are disposed in semiconductor production facilities, and used for cassette storage. Such stokers store cassettes of predetermined size so that cassettes may be stored therein when first installed.

SUMMARY OF THE INVENTION

The present disclosure describes a cassette storage case capable of storing and managing a cassette effectively, and a cassette management system including the same.

However, embodiments of the present invention are not limited to those mentioned above, and may be variously extended in the scope of the technical ideas included in the present invention.

According to an embodiment, a cassette storage case includes a body defining an internal storage space for a cassette, wherein the body includes a lower body part, and a shield body part extending upward from an upper surface outer region of the lower body part, wherein the shield body part has an opening in an upper portion thereof, and a load protruding portion extending outward from a bottom surface of the lower body part, wherein the load protruding portion has a shape that corresponds to a shape of the opening.

A support member is coupled to the upper portion of the shield body part adjacent the opening, and the support member has a block shape.

Further, the support member is coupled to an inner side surface of the shield body part, and when the load protruding portion is inserted into an upper part of a body of a second cassette storage case, a side of the load protruding portion is configured to contact an inner side surface of a shield body part of the second cassette storage case or a side of a support member coupled to the inner side surface of the shield body part of the second cassette storage case in at least two locations.

Further, the body may have a first condition detection aperture formed through one side of the body and a second condition detection aperture formed through an opposite side of the body, wherein the first and second condition detection apertures are positioned to facilitate detecting if the body is in a misaligned position.

Further, a condition detection aperture is formed through one side of the body, and a condition detection reflection member is on an inner surface of an opposite side of the body and facing the condition detection aperture, wherein the condition detection reflection member is configured to reflect an incident laser beam of light toward the condition detection aperture.

Further, the body may have a first condition detection aperture formed through a first side of the body and a second condition detection aperture formed through the first side of the body in adjacent, spaced apart relationship with the first condition detection aperture, and a condition detection reflection member on an inner surface of a second side of the body opposite to the first side, wherein the condition reflection member is configured to reflect a laser beam of light incident from the first condition detection aperture toward the second condition detection aperture.

Further, the body has a first cassette detection aperture formed through one side of the body, and a second cassette detection aperture formed through an opposite side the body, wherein the first and second cassette detection apertures are positioned to facilitate detecting if a cassette is within the storage space.

Further, a cassette detection aperture is formed through one side of the body, and a cassette detection reflection member is on an inner surface of an opposite side of the body facing the cassette detection aperture, wherein the cassette detection reflection member is configured to reflect an incident laser beam of light toward the cassette detection aperture.

Further, the body has a first cassette detection aperture formed through a first side of the body and a second cassette detection aperture formed through the first side of the body in adjacent, spaced apart relationship with the first cassette detection aperture, and a cassette detection reflection member on an inner surface of a second side of the body opposite to the first side, wherein the cassette detection reflection member is configured to reflect a laser beam of light incident from the first cassette detection aperture toward the second cassette detection aperture.

Further, at least one alignment protrusion may be on the upper surface of the lower body part.

Further, a saddle alignment opening may be formed through the lower body part.

An identification member storing a unique identification code may be on one side of the body.

A door may be on one side of the shield body part.

A sliding member may be on the upper surface of the lower body part and that is configured to slide in a direction toward the door.

According to another embodiment, a cassette storage case includes a body defining an internal storage space for a cassette, wherein the body includes a lower body part, and a shield body part extending upward from an upper surface outer region of the lower body part, wherein the shield body part has an opening in an upper portion thereof, and a support member is coupled to an inner surface of the upper part of the shield body part adjacent the opening, wherein the support member has a block shape. A load protruding portion extends outward from an outer bottom surface of the lower body part, wherein the load protruding portion has a shape that corresponds to a shape of the opening, and at least one detection aperture is formed through one side of the body.

According to another embodiment, a cassette management system includes a cassette storage case including a body defining an internal storage space for a cassette, and an interface device configured to receive the cassette storage case. The body includes a lower body part and a shield body part extending upward from an upper surface outer region of the lower body part, wherein the shield body part has an opening in an upper portion thereof, and a load protruding portion extending outward from an outer bottom surface of the lower body part, wherein the load protruding portion has a shape that corresponds to a shape of the opening.

Further, the interface device may include a frame, and an alignment port at an upper part of the frame, wherein the alignment port is configured to receive the lower body part of the cassette storage case.

Further, the interface device includes a saddle in an inner center region of the alignment port, and a saddle alignment opening is formed through the lower body part, wherein the saddle alignment opening is configured to receive an upper part of the saddle therein.

Further, the saddle may be moved up and down.

Further, the interface device may include a cassette position detection sensor on an upper surface of the saddle.

According to a cassette storage case and a cassette management system according to embodiments, cassettes may be stored and managed with high space utilization.

DETAILED DESCRIPTION OF THE EMBODIMENTS

Figure 1:
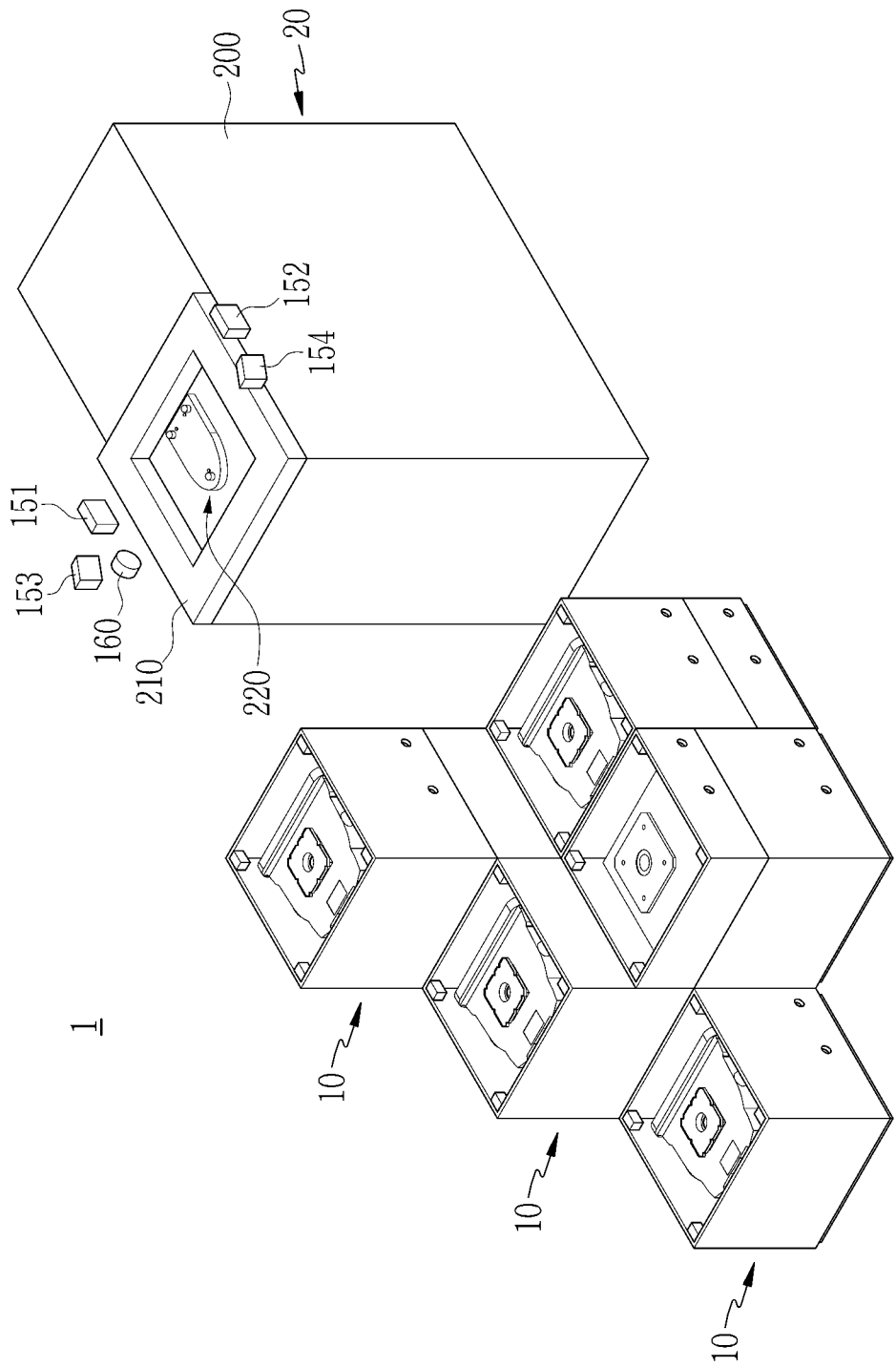
FIG. 1 is a drawing illustrating a cassette management system according to an embodiment.

Hereinafter, an embodiment of the present invention will be described in detail with reference to the accompanying drawings. A person of an ordinary skill in the art would realize, the described embodiments may be modified in various different ways, all without departing from the scope of the present invention. The present embodiment is provided so that this disclosure will be thorough and complete and will fully convey the concept of the present invention to those skilled in the art. Therefore, the shape of elements in the drawings has been exaggerated to emphasize a clearer explanation.

FIG. 1 is a drawing illustrating a cassette management system according to an embodiment.

Referring to FIG. 1, a cassette management system 1 according to an embodiment includes a cassette storage case 10 and an interface device 20.

The cassette management system 1 according to an embodiment stores a cassette C (FIG. 4), and manages carry-in and carry-out of the cassette C.

The cassette C managed by the cassette management system 1 according to an embodiment may be used to store a substrate therein. Here, the substrate may be a wafer, etc. The cassette C storing wafers may be a front opening unified pod (FOUP), etc. When the substrate is a reticle, the cassette C may be a device for storing the reticle.

Figure 2:
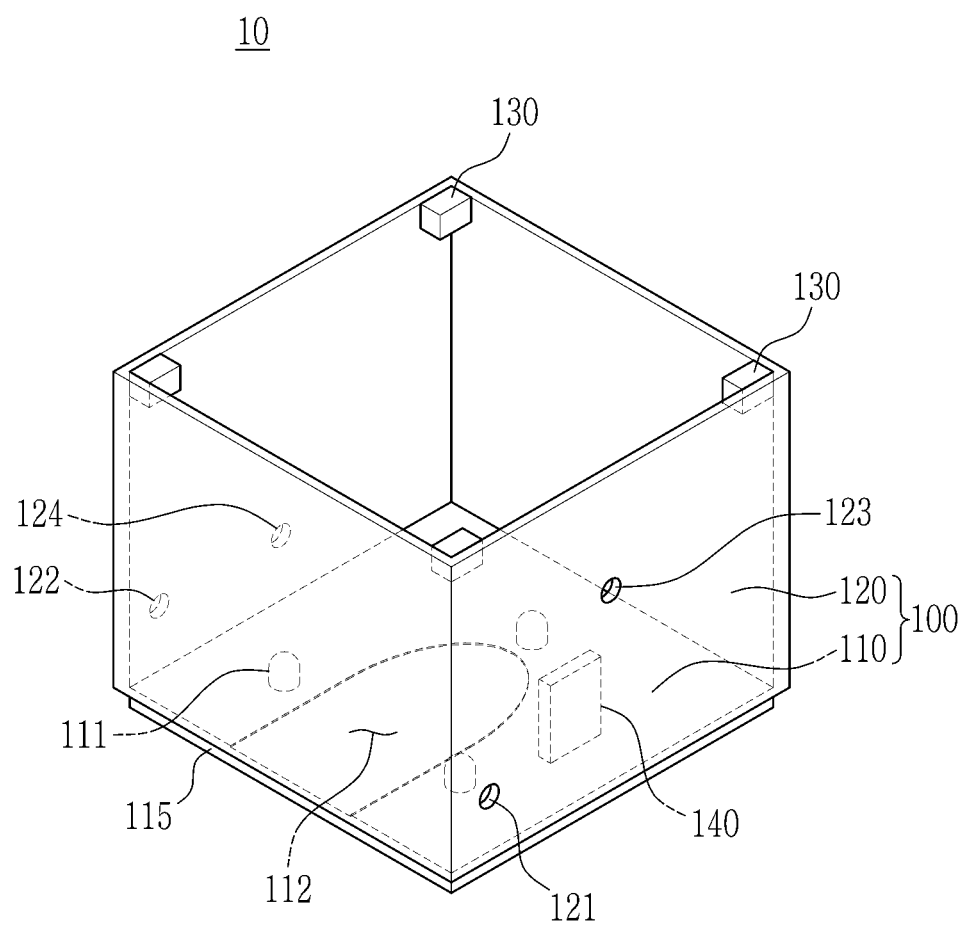
FIG. 2 is a drawing illustrating a cassette storage case of FIG. 1.
Figure 3:
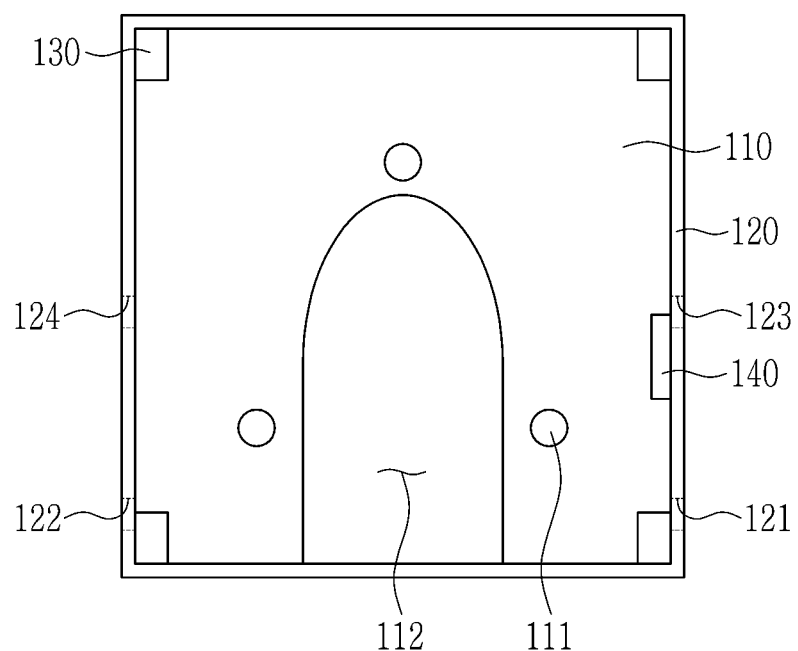
FIG. 3 is a top plan view of the cassette storage case of FIG. 2 from top to bottom.

FIG. 2 is a drawing illustrating a cassette storage case of FIG. 1. FIG. 3 is a top plan view of the cassette storage case of FIG. 2 from top to bottom.

Referring to FIG. 2 and FIG. 3, a cassette storage case 10 according to an embodiment includes a body 100, a support member 130, and an identification member 140.

The body 100 defines a storage space therein that is configured to receive the cassette C therein. The body 100 has a container structure with an opening in the upper portion thereof, as illustrated (i.e., the opening faces upward). The body 100 includes a lower body part 110 and a shield body part 120.

The lower body part 110 provides the lower structure of the body 100. The lower body part 110 may be provided in a plate structure with a predetermined area and thickness. The upper surface of the lower body part 110 may be a plane perpendicular to an upward and downward direction. The lower body part 110 may have a circular or polygonal shape. As an example, the lower body part 110 may have a quadrangular shape.

At least one alignment protrusion 111 may be disposed on the upper surface of the lower body part 110. When the cassette C is accommodated in the storage space of the cassette storage case 10, the alignment protrusion 111 may be inserted into a groove formed on the outer bottom surface of the cassette C. FIG. 2 and FIG. 3 illustrate three alignment protrusions 111 arranged in a triangle shape.

A saddle alignment opening 112 may be formed through the lower body part 110 up and down. At least some regions of the saddle alignment opening 112 may be formed in the inner region of the polygon formed when the alignment protrusions 111 are connected to each other with an imaginary straight line.

On the outer bottom surface of the lower body part 110, a load protruding portion 115 may be formed to protrude downward. The load protruding portion 115 may have a shape corresponding to the open region of the upper part of the body 100. The load protruding portion 115 has a shape that corresponds to the shape of the opening in the upper part of the body 100, and is configured to be inserted into the opening of another cassette storage case 10 in order to stack the two cassette storage cases. At least some regions of the load protruding portion 115 may be disposed at a predetermined distance from the exterior side of the lower body part 110. Accordingly, a step may be formed between at least some regions of the load protruding portion 115 and the exterior side of the lower body part 110. FIG. 2 illustrates a case where a step is formed between the load protruding portion 115 along the outer end part of the bottom surface of the lower body part 110.

The shield body part 120 extends a predetermined length upward from the upper surface outer region of the lower body part 110. As an example, the shield body part 120 may extend upwards from the upper surface outer end of the lower body part 110. A vertical length of the shield body part 120 may correspond to a vertical height of the cassette C accommodated therein. The vertical length of the shield body part 120 may be longer than the vertical height of the cassette C. Accordingly, when the cassette C is positioned in the storage space of the body 100, the top of the cassette C may be positioned below the top of the body 100. The shield body part 120 may have a quadrangular column shape with four faces corresponding to the lower body part 110.

Detection holes or apertures 121, 122, 123, and 124 may be formed on one side of the body 100. The detection apertures 121, 122, 123, and 124 are formed through the body 100 to connect the storage space to the outside.

The detection apertures 121, 122, 123, and 124 include condition detection apertures 121 and 122 and cassette detection apertures 123 and 124.

The condition detection apertures 121 and 122 allow checking of the disposition condition of the cassette storage case 10. The condition detection apertures 121 and 122 include a first condition detection aperture 121 and a second condition detection aperture 122.

The first condition detection aperture 121 is formed through the one side of the body 100. The first condition detection aperture 121 may be formed through the shield body part 120.

The second condition detection aperture 122 is formed through the one side of the body 100. The second condition detection aperture 122 may be formed through the shield body part 120. The second condition detection aperture 122 is disposed opposite the first condition detection aperture 121 with a storage space therebetween. An imaginary straight line connecting the first condition detection aperture 121 and the second condition detection aperture 122 is disposed outside the region where the cassette C is positioned in the storage space. The imaginary straight line connecting the first condition detection aperture 121 and the second condition detection aperture 122 may be disposed outside the polygonal region formed when the alignment protrusions 111 are connected to each other with the imaginary straight line, based on looking in an upward and downward direction.

The cassette detection holes or apertures 123 and 124 allow checking of whether the cassette C is stored in the cassette storage case 10. The cassette detection apertures 123 and 124 include the first cassette detection aperture 123 and the second cassette detection aperture 124.

The first cassette detection aperture 123 is formed through the one side of the body 100. The first cassette detection aperture 123 may be formed through the shield body part 120.

The second cassette detection aperture 124 is formed through the one side of the body 100. The second cassette detection aperture 124 may be formed through the shield body part 120. The second cassette detection aperture 124 is disposed opposite the first cassette detection aperture 123 with a storage space therebetween. An imaginary straight line connecting the first cassette detection aperture 123 and the second cassette detection aperture 124 passes through the area where the cassette C is positioned in the storage space. The imaginary straight line connecting the first cassette detection aperture 123 and the second cassette detection aperture 124 may pass through the polygonal region formed when the alignment protrusions 111 are connected to each other with the imaginary straight line, based on looking in an upward and downward direction. Further, the imaginary straight line connecting the first cassette detection aperture 123 and the second cassette detection aperture 124 may be adjacent to the polygon region formed when the alignment protrusions 111 are connected to each other with the imaginary straight line, based on looking in an upward and downward direction.

Figure 5:
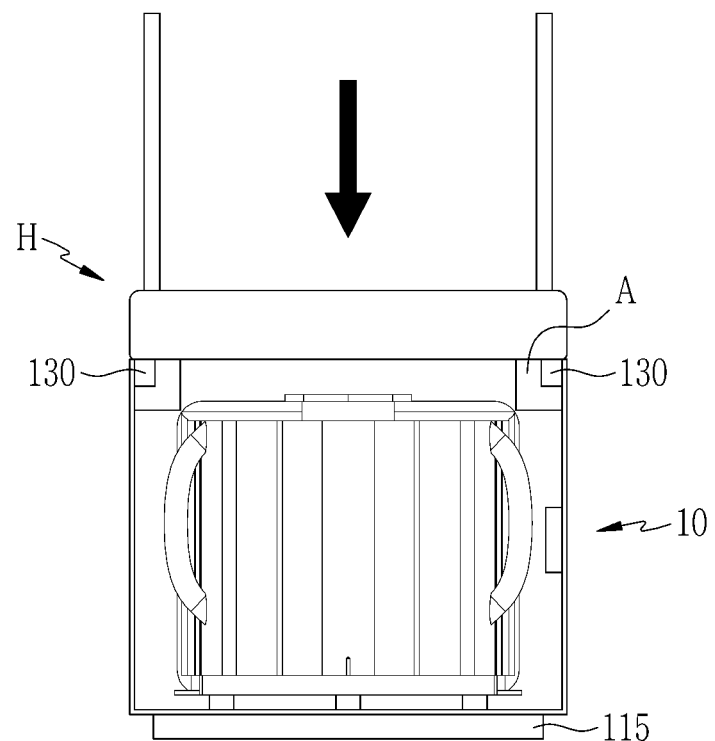
FIG. 5 to FIG. 7 are drawings illustrating how the cassette storage case is loaded in an upward and downward direction.
Figure 5:
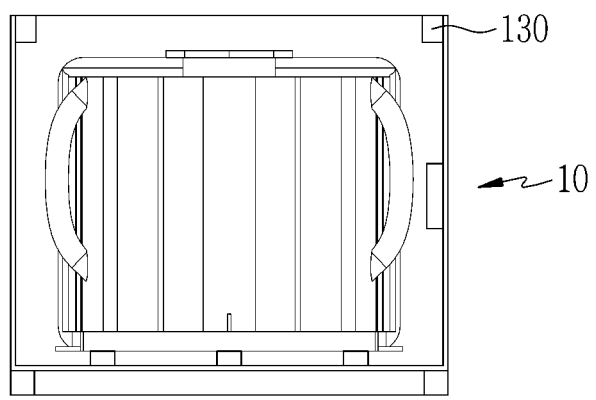

The support member 130 is picked up by a case transfer device (H of FIG. 5). The case transfer device H is a device provided to a semiconductor production facility to transfer goods, and may be an overhead hoist transport (OHT), etc. The case transfer device H may be moved along a rail installed in a ceiling region of a semiconductor production facility.

The support member 130 is provided as a block structure with a predetermined volume and is coupled to the upper part of the body 100. The support member 130 may be coupled to the upper part of the shield body part 120. As an example, the support member 130 may be coupled to the inner surface of the shield body part 120, preventing interference between the support members 130 when two or more cassette storage cases 10 are positioned adjacent to each other.

When the two cassette storage cases 10 are aligned up and down, the support member 130 may be aligned up and down with the step formed on the outer side of the load protruding portion 115. Accordingly, when the load protruding portion 115 of a cassette storage case 10 is inserted into upper part of the body 100 of another cassette storage case 10 to stack the two cassette storage cases 10, the step formed on the outer side of the load protruding portion 115 of the upper cassette storage case 10 may be supported by the upper surface of the support member 130 of the lower cassette storage case. In the illustrated embodiment, there are four support members 130. Each of the support members 130 are positioned at a respective corner of the upper part of the body 100, as illustrated.

When the load protruding portion 115 of one cassette storage case 10 is inserted into the upper part of the body 100 of another cassette storage case 10, the side of the load protruding portion 115 may abut the inner surface of the shield body part 120 or the side of the support member 130 of the other cassette storage case 10 in at least two locations. Accordingly, when two cassette storage cases 10 are loaded up and down (i.e., are vertically stacked), the upper cassette storage case 10 may be stably fixed.

At least two support members 130 may be provided and disposed facing each other with a storage space therebetween. FIG. 2 and FIG. 3 illustrate a case in which four support members 130 are disposed on the top edge of the inner surface of the shield body part 120.

The identification member 140 is disposed on one side of the body 100. The identification member 140 is provided to store a unique identification code and to identify the identification code through a code recognition member 160. For example, the identification member 140 may be provided as a radio frequency identification (RFID) tag. An RFID tag may be disposed on the inner surface of the shield body part 120, or on the upper surface of the lower body part 110, or may be located in the inner side of the body 100. The code recognition member 160 may be a reader capable of receiving RFID signals. In addition, the identification member 140 may be provided as a QR code and be attached to the exterior side of the body 100. The code recognition member 160 may be a QR code reader.

Figure 4:
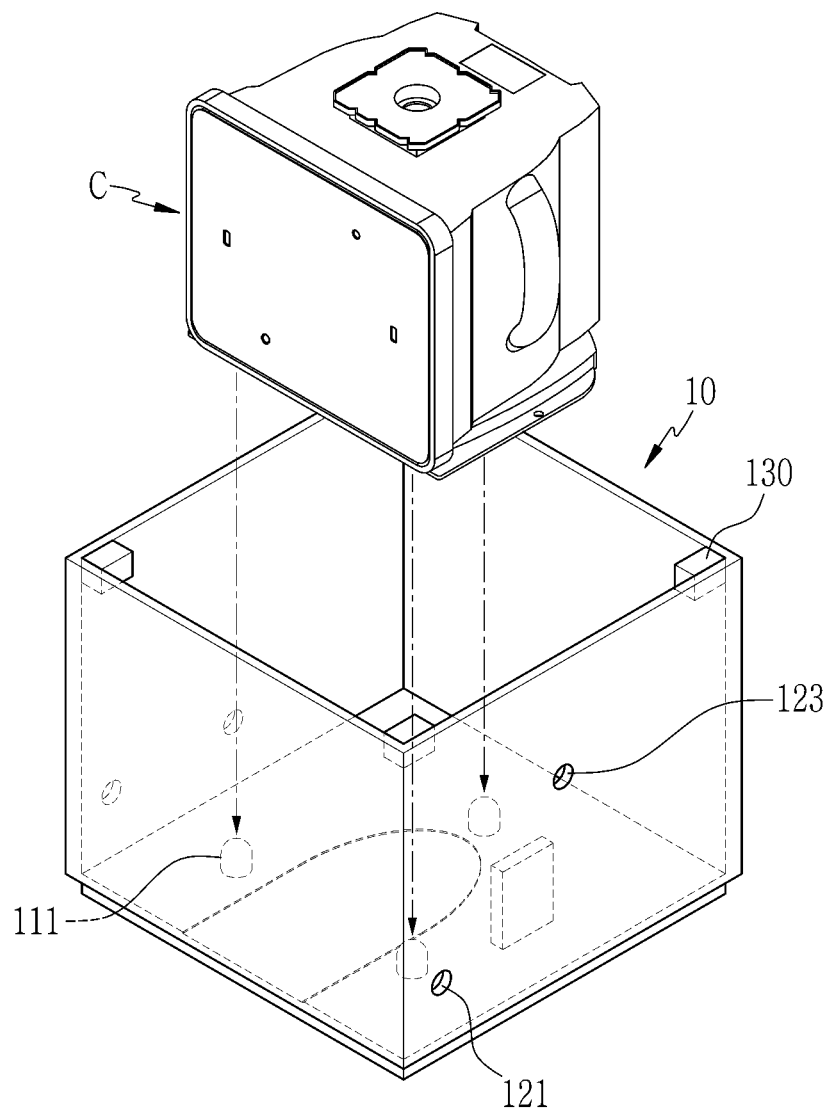
FIG. 4 is a drawing illustrating the condition of the cassette being accommodated into the cassette storage case.

FIG. 4 is a drawing illustrating the condition of a cassette being accommodated in (i.e., loaded into) the cassette storage case 10.

Referring to FIG. 4, the cassette C may be accommodated inside the cassette storage case 10 through the opening in the upper part of the body 100. The loading of the cassette C into the cassette storage case 10 may be performed manually by a worker using a manual port, or by using an overhead hoist transport (OHT) which is used to pick up the cassette C. The alignment groove formed on the bottom surface of the cassette C is inserted into the alignment protrusions 111, and the cassette C may be fixed in position by the alignment protrusions 111.

Further, the cassette C may be removed from the cassette storage case 10 through the opening in the upper part of the body 100. The removal of the cassette C may be performed manually by a worker, or by using an OHT which is used to pick up the cassette C.

Figure 6:
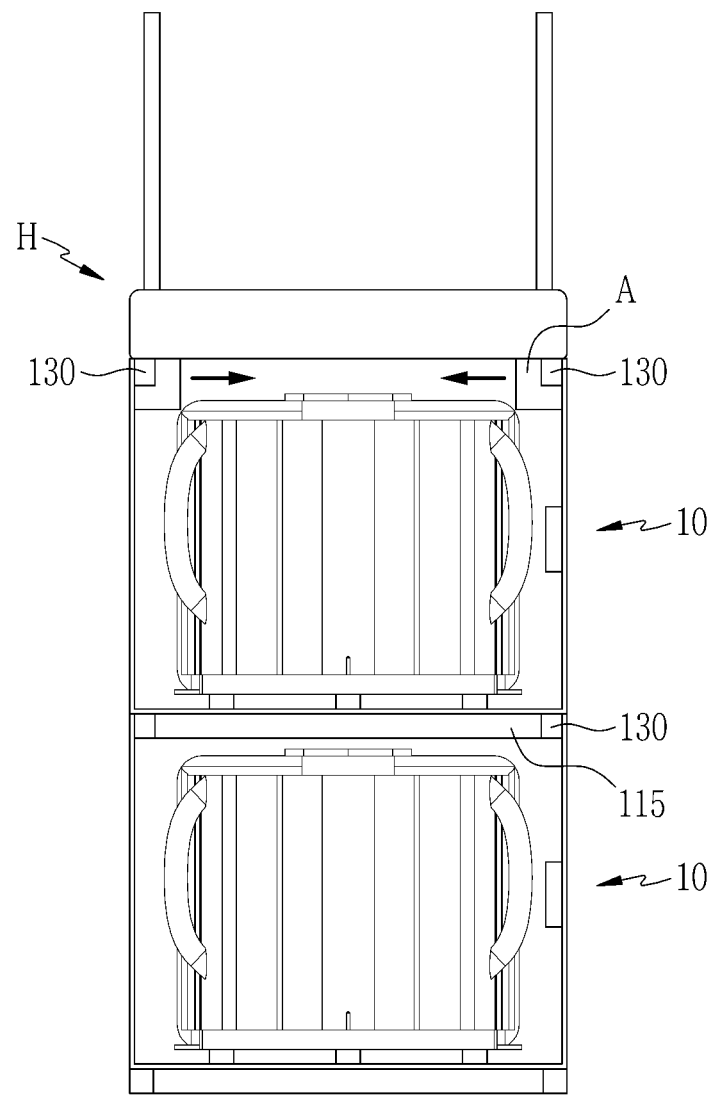
Figure 7:
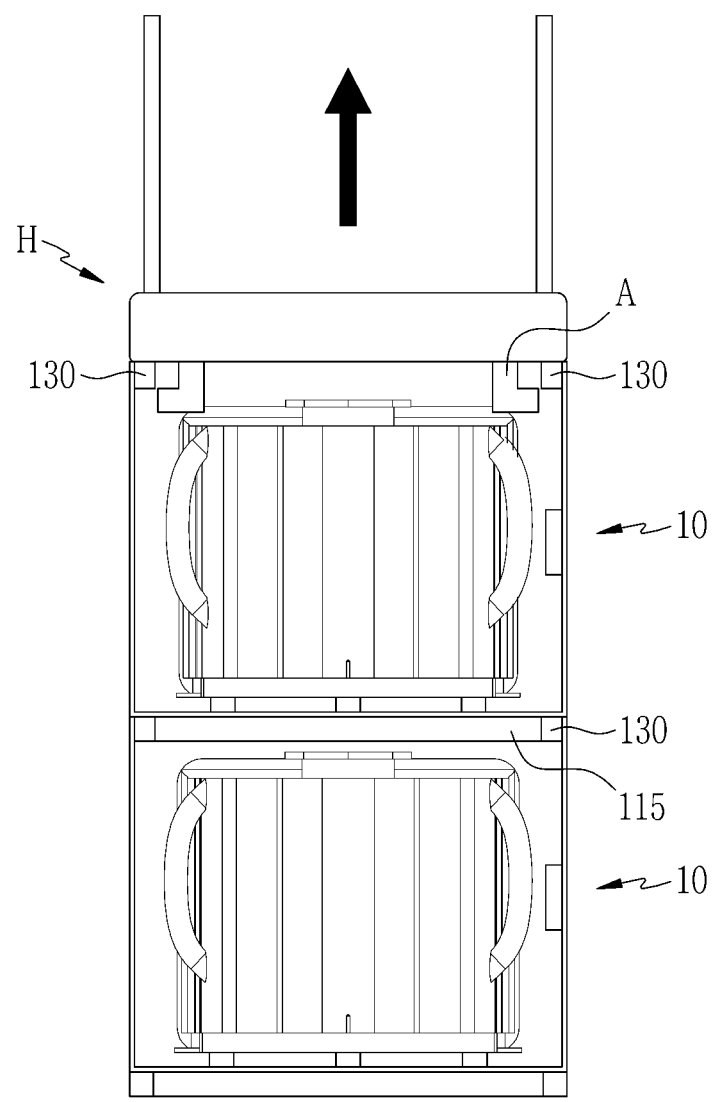

FIG. 5 to FIG. 7 are drawings illustrating how the cassette storage case 10 is loaded in an upward and downward direction.

Referring to FIG. 5 to FIG. 7, two or more cassette storage cases 10 may be loaded in an upward and downward direction.

The cassette storage case 10 to be newly loaded may be moved to the position to be loaded by the case transfer device H. An arm A of the case transfer device H may grip the cassette storage case 10 through the support member 130 (i.e., the arm A is configured to engage with the support member 130 so that the case transfer device H can raise and lower the cassette storage case 10) . . . .

When the cassette storage case 10 to be newly loaded is aligned up and down with the cassette storage case 10 at the bottom, the case transfer device H is lowered and places the cassette storage case 10 to be newly loaded above the cassette storage case 10 positioned below. Accordingly, the load protruding portion 115 is inserted into the inner side of the upper part of the cassette storage case 10 positioned below, and the cassette storage case 10 is loaded up and down (i.e., the two cassette storage cases 10 are stacked).

When the cassette storage case 10 is loaded up and down, the arms A of the case transfer device H move in the direction facing each other as shown in FIG. 6, and may be separated from the support member 130. When the arm A of the case transfer device H is completely separated from the support member 130, the case transfer device H rises and completes the loading of the cassette storage case 10 up and down.

Similar to the above method, the case transfer device H may pick up the cassette storage case 10 by being aligned with the cassette storage case 10 up and down, and then descending to grip the support member 130 through the arm A, and rise.

Loading or picking up of the cassette storage case 10 may also be performed by a worker. Loading or picking up by a worker may be assisted by a manual port, etc.

Figure 8:
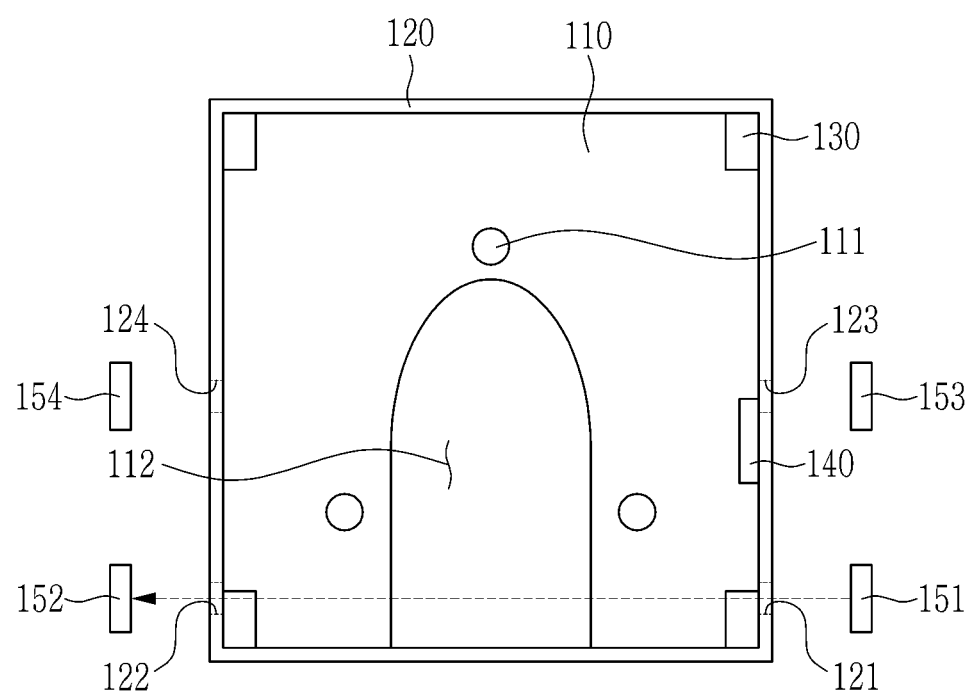
FIG. 8 and FIG. 9 are drawings illustrating how to check the disposition condition of the cassette storage case.
Figure 9:
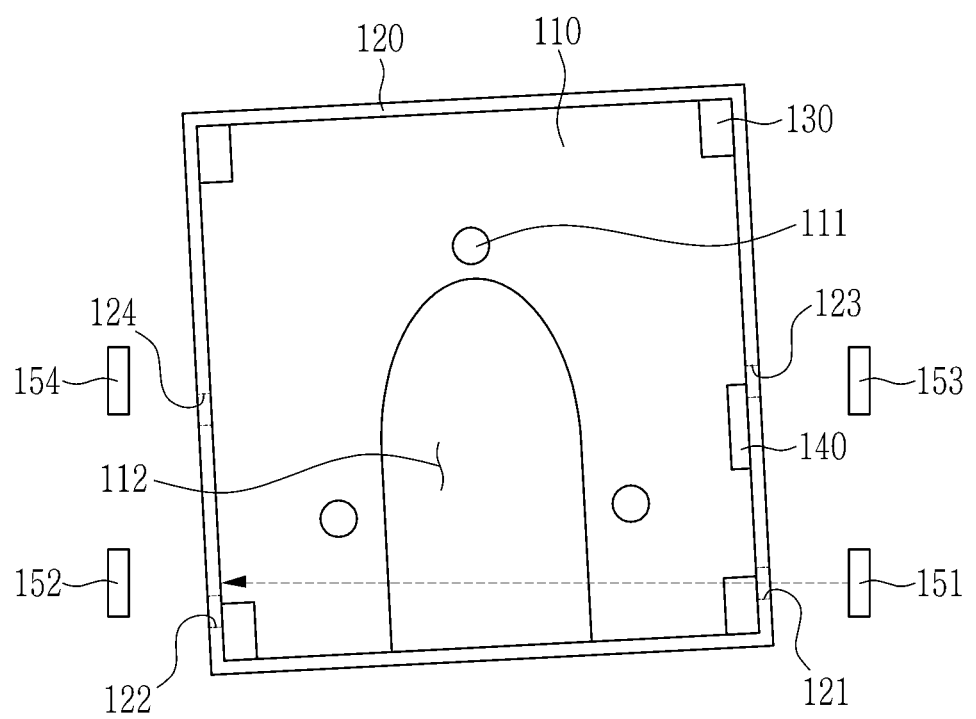

FIG. 8 and FIG. 9 are drawings illustrating how to check the disposition condition of the cassette storage case.

Referring to FIG. 8 and FIG. 9, condition detection members 151, 152 may detect whether the cassette storage case 10 is correctly positioned.

The condition detection members 151 and 152 are installed on the space where the cassette storage case 10 is positioned. The condition detection members 151 and 152 include a condition detection light emitter 151 and a condition detection light receiver 152.

The condition detection light emitter 151 emits a laser beam of light. The condition detection light receiver 152 detects the laser beam of light emitted from the condition detection light emitter 151. Based on the correct position of the cassette storage case 10, the condition detection light emitter 151 and the condition detection light receiver 152 are positioned on an imaginary straight line connecting the first condition detection aperture 121 and the second condition detection aperture 122.

When the cassette storage case 10 is properly positioned, the laser beam of light emitted from the condition detection light emitter 151 is incident on the condition detection light receiver 152 after passing through the first condition detection aperture 121 and the second condition detection aperture 122. Accordingly, the condition detection members 151 and 152 may determine that the cassette storage case 10 is correctly positioned when a laser beam of light is detected within a predetermined time at the condition detection light receiver 152 after the laser beam of light is emitted from the condition detection light emitter 151.

On the other hand, when the cassette storage case 10 is twisted (i.e., misaligned) with respect to the correct position, the condition detection light emitter 151 and the condition detection light receiver 152 are positioned out of an imaginary straight line connecting the first condition detection aperture 121 and the second condition detection aperture 122 (FIG. 9). When the cassette storage case 10 is loaded in an upside-down position with respect to the correct position, the laser beam of light emitted from the condition detection light emitter 151 will not pass through both the first condition detection aperture 121 and the second condition detection aperture 122. Accordingly, the condition detection members 151 and 152 may determine that the cassette storage case 10 is incorrectly positioned when a laser beam of light is not detected within a predetermined time at the condition detection light receiver 152 after the laser beam of light is emitted from the condition detection light emitter 151.

Figure 10:
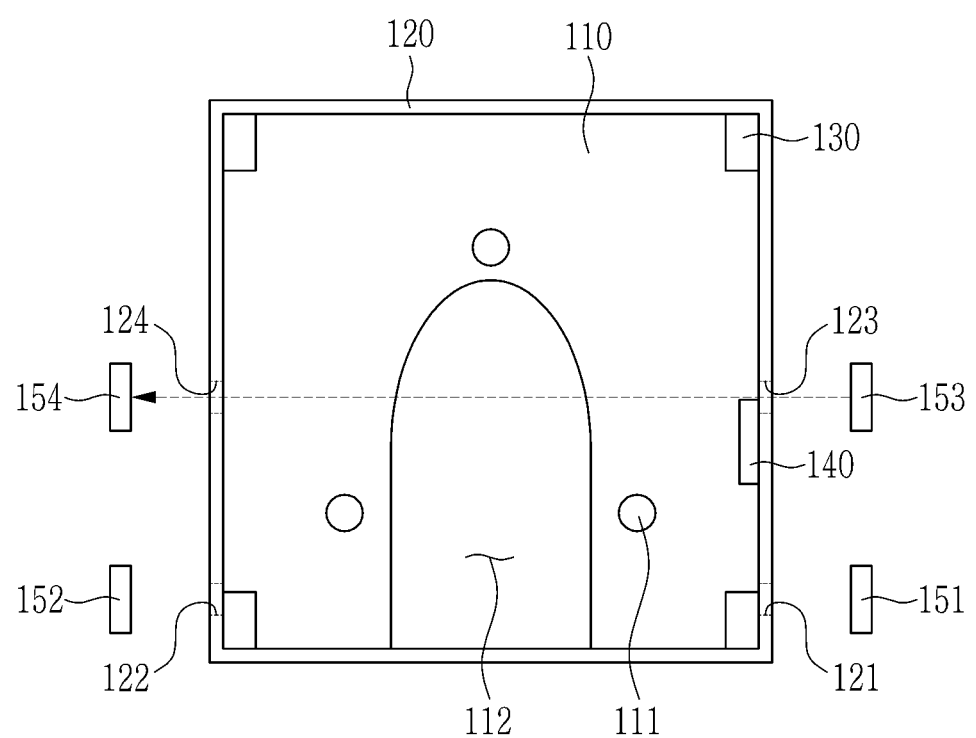
FIG. 10 and FIG. 11 are drawings illustrating how to check if the cassette is stored inside the cassette storage case.
Figure 11:
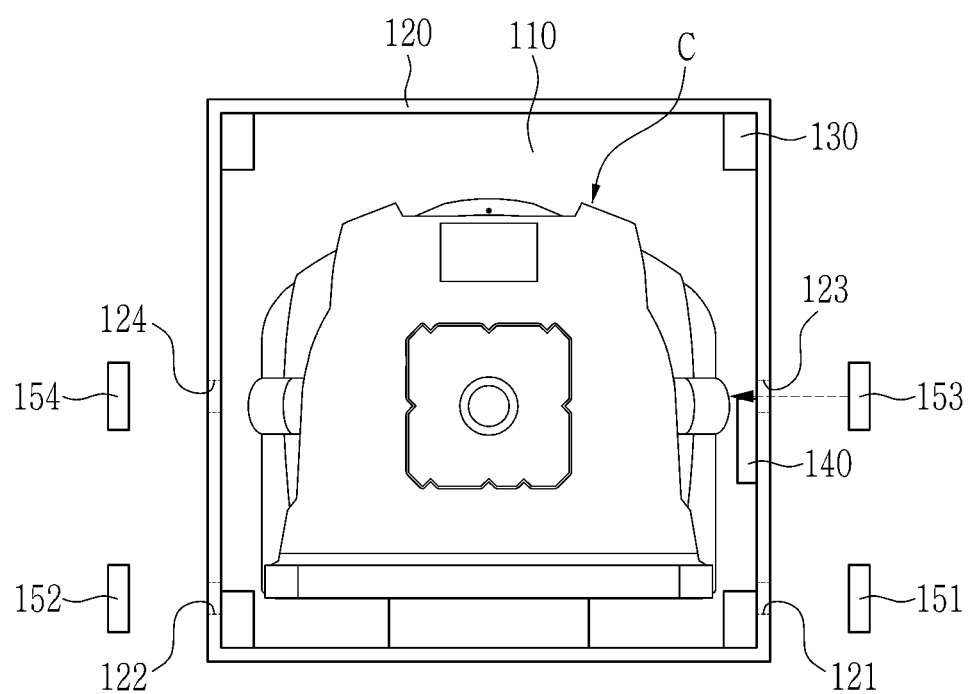

FIG. 10 and FIG. 11 are drawings illustrating how to check if the cassette is stored inside the cassette storage case.

Referring to FIG. 10 and FIG. 11, condition detection members 153 and 154 detect whether the cassette C is stored inside the cassette storage case 10. After the condition detection members 151 and 152 determine that the cassette storage case 10 is correctly positioned, detection by the cassette detection members 153 and 154 may be performed.

The cassette detection members 153 and 154 are installed on the space where the cassette storage case 10 is positioned. The cassette detection members 153 and 154 include a cassette detection light emitter 153 and a cassette detection light receiver 154.

The cassette detection light emitter 153 emits a laser beam of light. The cassette detection light receiver 154 detects the laser beam of light emitted from the cassette detection light emitter 153. Based on the correct position of the cassette storage case 10, the cassette detection light emitter 153 and the cassette detection light receiver 154 are positioned on an imaginary straight line connecting the first cassette detection aperture 123 and the second cassette detection aperture 124.

When the cassette storage case 10 is empty, the laser beam of light emitted from the cassette detection light emitter 153 is incident on the cassette detection light receiver 154 after passing through the first cassette detection aperture 123 and the second cassette detection aperture 124. Accordingly, the cassette detection members 153 and 154 may determine that the cassette storage case 10 is empty when a laser beam of light is detected within a predetermined time at the cassette detection light receiver 154 after the laser beam of light is emitted from the cassette detection light emitter 153.

On the other hand, when the cassette C is stored in the cassette storage case 10, the cassette C is positioned on an imaginary straight line connecting the first cassette detection aperture 123 and the second cassette detection aperture 124. When the cassette C is stored inside the cassette storage case 10, the laser beam of light emitted from the cassette detection light emitter 153 is blocked by the cassette C and cannot proceed (FIG. 11). Accordingly, the cassette detection members 153 and 154 may determine that the cassette C is stored inside the cassette storage case 10 when a laser beam of light is not detected within a predetermined time at the cassette detection light receiver 154 after the laser beam of light is emitted from the cassette detection light emitter 153.

The cassette storage case 10 according to an embodiment may reliably store the cassette C.

In addition, the cassette storage case 10 according to an embodiment may be loaded as two or more in an upward and downward direction (i.e., vertically stacked), thereby improving spatial utility.

Further, the cassette storage case 10 according to an embodiment adjusts the shape in which the plurality of cassette storage case 10 are mutually loaded, so that the loading may be adapted to the size and shape of the space used for loading the cassette storage case 10.

Further, the cassette storage case 10 according to an embodiment is interchangeable having different heights, so that the cassettes C of different heights may be stored in a single loading space, allowing for better spatial utility.

Further, a stoker, a structure conventionally used for storing cassettes C, has a form including a metal beam structure. Accordingly, a limited ratio of the total space occupied by the stoker is allocated for storing the actual cassette C. On the other hand, the cassette storage case 10 according to an embodiment has a high ratio of the space in which the cassette C is stored to its volume, allowing for high spatial utility.

Further, the cassette storage case 10 according to an embodiment may be managed and used by distinguishing two or more cassette storage cases through the identification member 140.

Further, the cassette storage case 10 according to an embodiment may be effectively measured for twisting (i.e., misalignment) during the loading process.

Further, the cassette storage case 10 according to an embodiment may effectively measure or determine whether the cassette C is stored therein.

Figure 12:
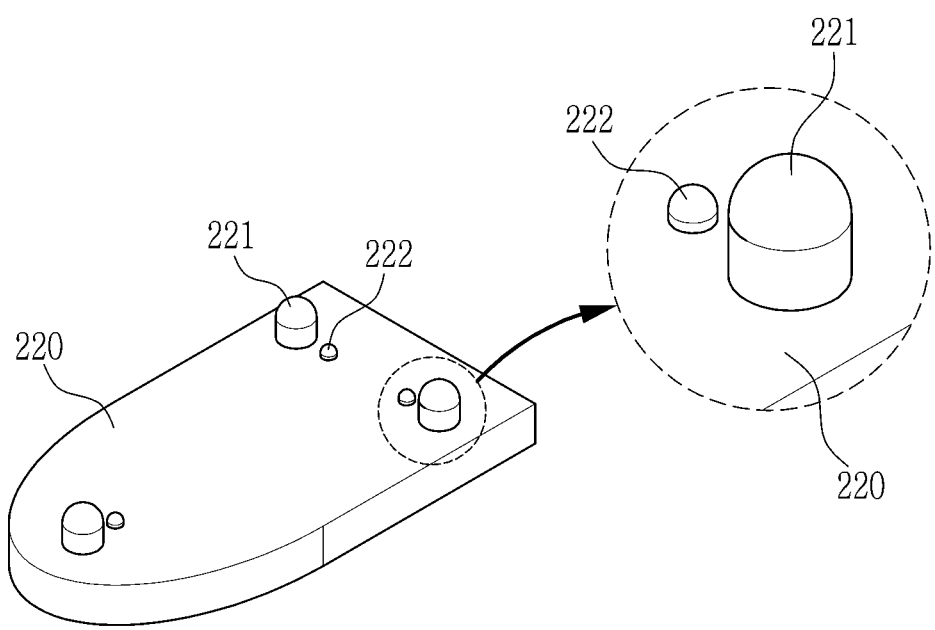
FIG. 12 is a drawing illustrating a saddle included in the interface device of FIG. 1.
Figure 13:
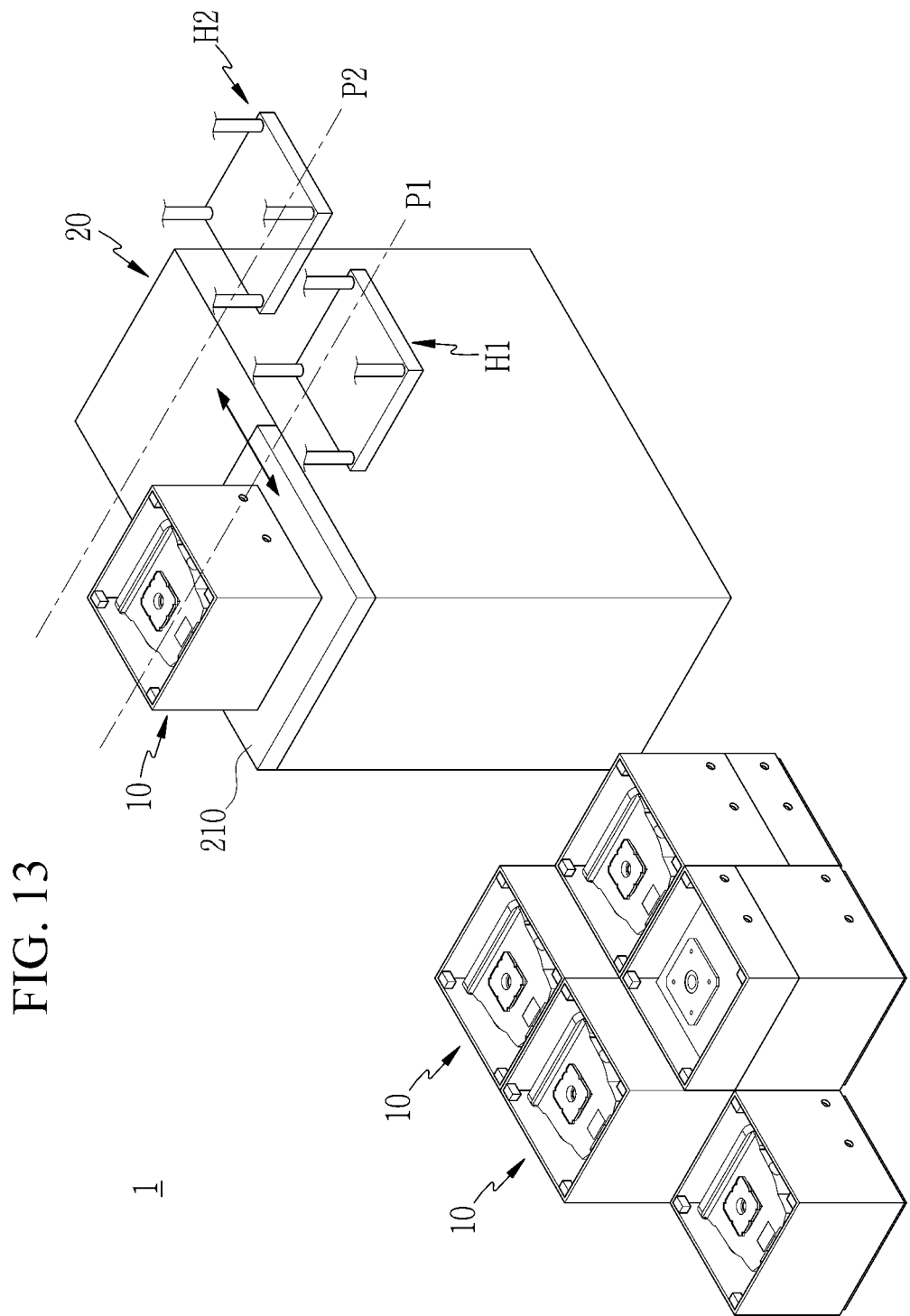
FIG. 13 is a drawing illustrating the condition in which the cassette storage case is positioned in an alignment port.

FIG. 12 is a drawing illustrating a saddle 220 included in the interface device of FIG. 1. FIG. 13 is a drawing illustrating the condition in which the cassette storage case 10 is positioned in an alignment port 210.

Referring to FIGS. 1, 12, and 13, an interface device 20 is positioned adjacent to a loading space of the cassette storage case 10 to manage the condition of the cassette storage case 10 being carried in or carried out from the loading space.

The interface device 20 includes a frame 200, an alignment port 210, and a saddle 220.

The frame 200 has a predetermined volume and is positioned adjacent to the loading space of the cassette storage case 10.

The alignment port 210 is disposed on one side of the frame 200. In one example, the alignment port 210 may be disposed at an upper part of the frame 200. In the inner center region of the alignment port 210, a space is formed into which the lower portion of the cassette storage case 10 is inserted. As an example, the inner center region of the alignment port 210 may have a shape corresponding to a load protruding portion 115 of the cassette storage case 10. The alignment port 210 may be movably provided along the frame 200. As an example, the alignment port 210 may be moved along a direction closer to the loading space and a direction further away from the loading space.

In the space above the moving path of the alignment port 210, the moving paths P1 and P2 of the case transfer device H may be positioned. The case transfer device H may have at least two moving paths P1 and P2. A first case transfer device H1, which moves the cassette storage case 10 between the interface device 20 and the loading space, may move along the first moving path P1 positioned adjacent to the loading space.

A second case transfer device H2, which carries out the cassette storage case 10 from the interface device 20 to the outside or carries in the cassette storage case 10 from the outside into the interface device 20, may move along the second moving path P2, which is positioned at a distance from the loading space.

The above-described condition detection members 151 and 152, cassette detection members 153 and 154, and the code recognition member 160 may be positioned adjacent to the alignment port 210 to perform inspections on cassette storage cases 10 as they are carried in to, or carried out from, the loading space.

In addition, the condition detection members 151 and 152, cassette detection members 153 and 154, and the code recognition member 160 are positioned in the loading space to perform inspections on the cassette storage case 10 loaded in the loading space.

The saddle 220 is disposed on the moving path of the alignment port 210. As an example, the saddle 220 may be disposed in an inner center region of the alignment port 210 and move with the alignment port 210. The saddle 220 may be moved in an upward and downward direction to adjust a height thereof. The upper part of the saddle 220 may be inserted into the saddle alignment opening 112. The upper part of the saddle 220 may have a shape corresponding to the saddle alignment opening 112. When the cassette storage case 10 is positioned in the alignment port 210, the upper part of the saddle 220 is aligned up and down with the saddle alignment opening 112.

At least one detection protrusion 221 may be disposed on the upper surface of the saddle 220. FIG. 1 and FIG. 12 illustrate three detection protrusions 221 arranged in a triangle shape. On the outer bottom surface of the cassette C, a groove (R in FIG. 14) may be formed with a shape corresponding to the detection protrusion 221.

At least one cassette position detection sensor 222 may be provided on the upper surface of the saddle 220.

Figure 14:
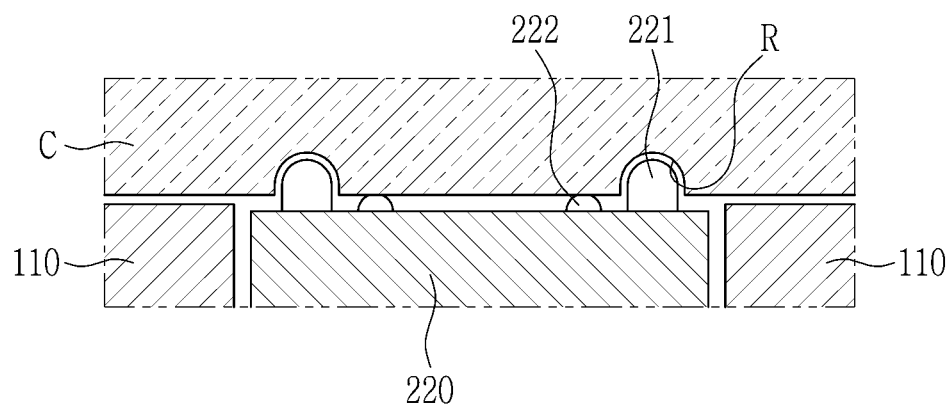
FIG. 14 is a vertical cross-sectional view when the outer bottom surface of the cassette and the saddle are positioned adjacent to each other.

FIG. 14 is a vertical cross-sectional view when the outer bottom surface of the cassette and the saddle are positioned adjacent to each other.

Referring to FIG. 14, when the cassette storage case 10 in which the cassette C is stored is positioned in the alignment port 210, the saddle 220 is positioned on the underside of the cassette C. The upper surface of the saddle 220 is positioned adjacent to the bottom surface of the cassette C so that the detection protrusion 221 may be inserted into a groove R on the bottom surface of the cassette C. In this case, the saddle 220 may be moved up and down to adjust the height of the upper surface. When the cassette C is correctly positioned inside the cassette storage case 10, the cassette position detection sensor 222 is loaded by contacting the bottom surface of the cassette C. Accordingly, when contact of the cassette C is detected, the cassette position detection sensor 222 may detect that the cassette C is correctly positioned inside the cassette storage case 10. In addition, the cassette position detection sensor 222 is provided to detect a load, and if the detected load is above a predetermined value, the cassette C may be detected as being correctly positioned inside the cassette storage case 10. Further, when two or more cassette position detection sensors 222 are provided, if the cassette C is properly positioned inside the cassette storage case 10, the load detected by the respective cassette position detection sensors 222 may be within a predetermined deviation. Accordingly, if the deviation of the detected load is below the predetermined value, the cassette position detection sensor 222 may detect that the cassette C is correctly positioned inside the cassette storage case 10.

On the other hand, if the cassette C is not properly positioned inside the cassette storage case 10, the bottom surface of the cassette C may be tilted relative to a plane perpendicular to the upward and downward direction. In addition, the detection protrusion 221 may not be properly inserted into the groove R on the bottom surface of the cassette C, resulting in a greater distance between the bottom surface of the cassette C and the upper surface of the saddle 220, or the distance between the bottom surface of the cassette C and the upper surface of the saddle 220 may vary in different regions. Accordingly, the cassette position detection sensor 222 may detect that the cassette C is out of the correct position if contact with the cassette C is not detected. Further, the cassette position detection sensor 222 may detect that the cassette C is out of the correct position if the detected load is below a predetermined value. Further, when two or more cassette position detection sensors 222 are provided, if the deviation of the detected load is above a predetermined value, the cassette position detection sensor 222 may detect that the cassette C is out of the correct position.

When the alignment port 210 is positioned on the underside of the first moving path, or when it is positioned on the underside of the second moving path, the cassette position detection sensor 222 may perform position detection of the cassette C.

Figure 15:
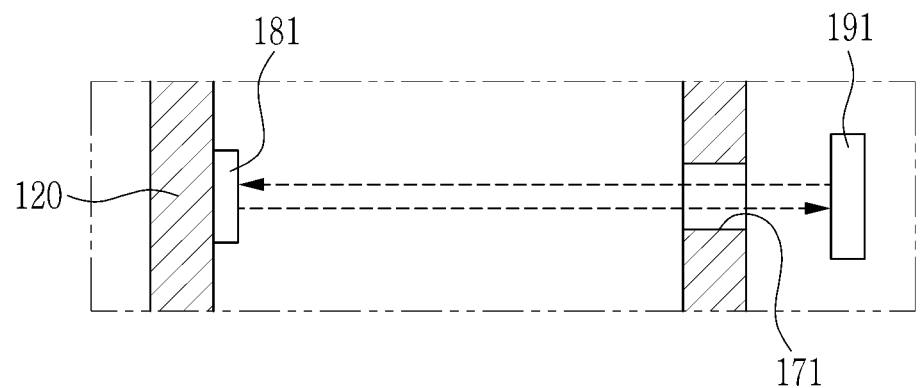
FIG. 15 is a drawing illustrating a condition detection aperture according to another embodiment.

FIG. 15 is a drawing illustrating a condition detection aperture according to another embodiment.

Referring to FIG. 15, a condition detection aperture 171 according to another embodiment is formed through the one side of the body 100. The condition detection aperture 171 may be formed through the shield body part 120. A condition detection reflection member 181 is disposed on the inner surface of the body 100 with the condition detection aperture 171 placing a storage space therebetween. The condition detection reflection member 181 reflects the incident laser beam of light toward the condition detection aperture 171.

An imaginary straight line connecting the condition detection aperture 171 and the condition detection reflection member 181 is disposed outside the region where the cassette C is positioned in the storage space. Based on looking in an upward and downward direction, the imaginary straight line connecting the condition detection aperture 171 and the condition detection reflection member 181 may be positioned outside the polygonal region formed when the alignment protrusions 111 are connected to each other with the imaginary straight line.

Based on when the cassette storage case 10 is correctly positioned, a condition detection member 191 is positioned on an imaginary straight line connecting the condition detection aperture 171 and the condition detection reflection member 181.

The condition detection member 191 emits a laser beam of light and detects the laser beam of light reflected from the condition detection reflection member 181. Accordingly, the condition detection member 191 may determine that the cassette storage case 10 is correctly positioned if the laser beam of light is detected within a predetermined time after emitting the laser beam of light. On the other hand, the condition detection member 191 may determine that the cassette storage case 10 is incorrectly positioned if the laser beam of light is not detected within a predetermined time after emitting the laser beam of light.

Figure 16:
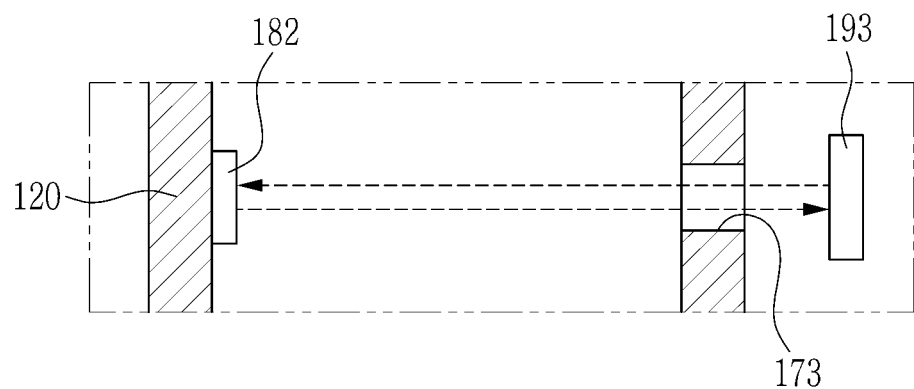
FIG. 16 is a drawing illustrating a cassette detection aperture according to another embodiment.

FIG. 16 is a drawing illustrating a cassette detection aperture according to another embodiment.

Referring to FIG. 16, a cassette detection aperture 173 according to another embodiment is formed through the one side of the body 100. The cassette detection aperture 173 may be formed through the shield body part 120. A cassette detection reflection member 182 is disposed on the inner surface of the body 100 facing the cassette detection aperture 173 with a storage space therebetween. The cassette detection reflection member 182 reflects the incident laser beam of light toward the cassette detection aperture 173.

An imaginary straight line connecting the cassette detection aperture 173 and the cassette detection reflection member 182 is positioned to pass the region where the cassette C is positioned in the storage space. The imaginary straight line connecting the cassette detection aperture 173 and the cassette detection reflection member 182 may pass through the polygonal region formed when the alignment protrusions 111 are connected to each other with the imaginary straight line, based on looking in a vertical direction. Further, based on looking in an upward and downward direction, the imaginary straight line connecting the cassette detection aperture 173 and the cassette detection reflection member 182 may be adjacent to the polygon formed when the alignment protrusions 111 are connected to each other with the imaginary straight line.

Based on the correct position of the cassette storage case 10, a cassette detection member 193 is positioned on an imaginary straight line connecting the cassette detection aperture 173 and the cassette detection reflection member 182.

The cassette detection member 193 emits the laser beam of light and detects the laser beam of light reflected from the cassette detection reflection member 182. Accordingly, the cassette detection member 193 may determine that the cassette storage case 10 is empty if the laser beam of light is detected within a predetermined time after emitting the laser beam of light. On the other hand, the cassette detection member 193 may determine that a case is stored in the cassette storage case 10 if the laser beam of light is not detected within a predetermined time after emitting the laser beam of light.

Figure 17:
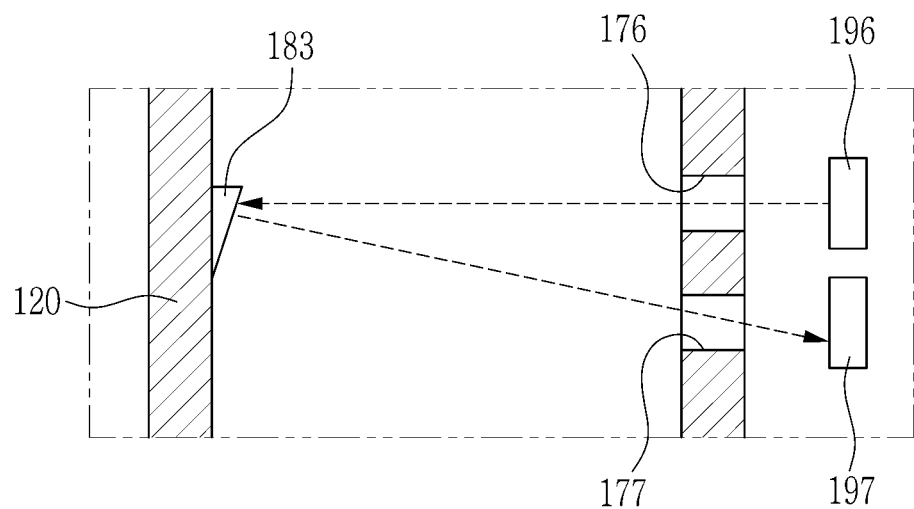
FIG. 17 is a drawing illustrating a condition detection aperture according to another embodiment.

FIG. 17 is a drawing illustrating a condition detection aperture according to another embodiment.

Referring to FIG. 17, cassette detection apertures 176 and 177 according to another embodiment is formed through the one side of the body 100.

The condition detection apertures 176 and 177 include a first condition detection aperture 176 and a second condition detection aperture 177.

The first condition detection aperture 176 is formed through one side of the body 100. The first condition detection aperture 176 may be formed through the shield body part 120.

The second condition detection aperture 177 is formed through one side of the body 100. The second condition detection aperture 177 may be formed through the shield body part 120.

A condition detection reflection member 183 is disposed on the inner surface of the body 100 facing the first condition detection aperture 176 and the second condition detection aperture 177, with a storage space therebetween. The condition detection reflection member 183 reflects the laser beam of light incident from the first condition detection aperture 176 toward the second condition detection aperture 177.

An imaginary straight line connecting the first condition detection aperture 176 and the condition detection reflection member 183, and an imaginary straight line connecting the second condition detection aperture 177 and the condition detection reflection member 183, are positioned outside the region where the cassette C is positioned in the storage space. Based on looking in an upward and downward direction, the imaginary straight line connecting the first condition detection aperture 176 and the condition detection reflection member 183, and the imaginary straight line connecting the second condition detection aperture 177 and the condition detection reflection member 183 may be positioned outside the polygonal region formed when the alignment protrusions 111 are connected to each other with the imaginary straight line.

The condition detection members 196 and 197 include a condition detection light emitter 196 and a condition detection light receiver 197.

Based on the correct position of the cassette storage case 10, the condition detection light emitter 196 is positioned on an imaginary straight line connecting the first condition detection aperture 171 and the condition detection reflection member 183.

Based on the correct position of the cassette storage case 10, the condition detection light receiver 197 is positioned on an imaginary straight line connecting the second condition detection aperture 177 and the condition detection reflection member 183.

The condition detection members 196 and 197 may determine that the cassette storage case 10 is correctly positioned when a laser beam of light is detected within a predetermined time at the condition detection light receiver 197 after the laser beam of light is emitted from the condition detection light emitter 196.

The condition detection members 196, 197 may determine that the cassette storage case 10 is incorrectly positioned when a laser beam of light is not detected within a predetermined time at the condition detection light receiver 197 after the laser beam of light is emitted from the condition detection light emitter 196.

Figure 18:
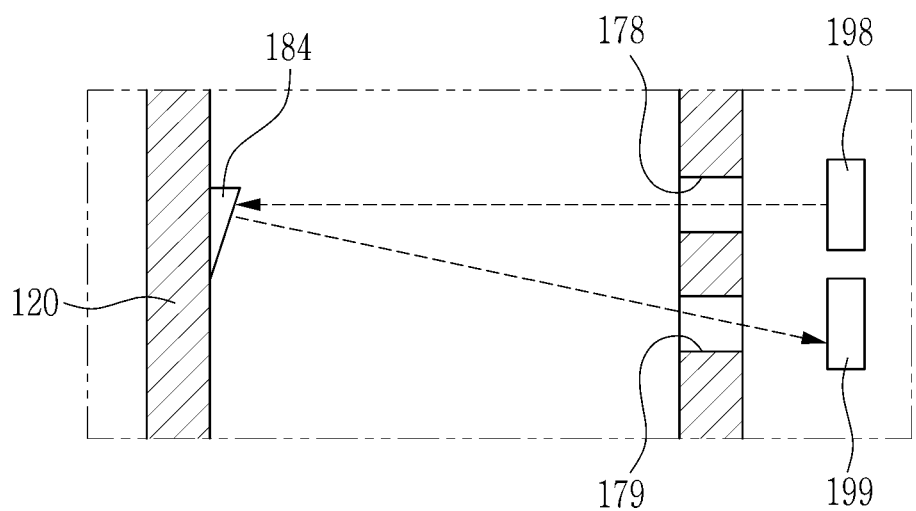
FIG. 18 is a drawing illustrating a cassette detection aperture according to an embodiment.

FIG. 18 is a drawing illustrating a cassette detection aperture according to an embodiment.

Referring to FIG. 18, cassette detection apertures 178 and 179 according to another embodiment are formed through one side of the body 100.

The cassette detection apertures 178 and 179 include the first cassette detection aperture 178 and the second cassette detection aperture 179.

The first cassette detection aperture 178 is formed through the one side of the body 100. The first cassette detection aperture 178 may be formed through the shield body part 120.

The second cassette detection aperture 179 is formed through the one side of the body 100. The second cassette detection aperture 179 may be formed through the shield body part 120.

A cassette detection reflection member 184 is disposed on the inner surface of the body 100 facing the first cassette detection aperture 178 and the second cassette detection aperture 179 with a storage space therebetween. The cassette detection reflection member 184 reflects a laser beam of light incident from the first cassette detection aperture 178 toward the second cassette detection aperture 179.

At least one of an imaginary straight line connecting the first cassette detection aperture 178 and the cassette detection reflection member 184, and an imaginary straight line connecting the second cassette detection aperture 179 and the cassette detection reflection member 184, passes through the region where the cassette C is positioned in the storage space.

Based on looking in an upward and downward direction, at least one of the imaginary straight line connecting the first cassette detection aperture 178 and the cassette detection reflection member 184, and the imaginary straight line connecting the second cassette detection aperture 179 and the cassette detection reflection member 184, may pass through the polygonal region formed when the alignment protrusions 111 are connected to each other with the imaginary straight line.

Further, based on looking in an upward and downward direction, at least one of the imaginary straight line connecting the first cassette detection aperture 178 and the cassette detection reflection member 184, and the imaginary straight line connecting the second cassette detection aperture 179 and the cassette detection reflection member 184, may be adjacent to the polygon formed when the alignment protrusions 111 are connected to each other with the imaginary straight line.

The cassette detection members 198 and 199 include a cassette detection light emitter 198 and a cassette detection light receiver 199.

Based on when the cassette storage case 10 is correctly positioned, the cassette detection light emitter 198 is positioned on an imaginary straight line connecting the first cassette detection aperture 178 and the cassette detection reflection member 184.

Based on when the cassette storage case 10 is correctly positioned, the cassette detection light receiver 199 is positioned on an imaginary straight line connecting the second cassette detection aperture 179 and the cassette detection reflection member 184.

The cassette detection members 198 and 199 may determine that the cassette storage case 10 is empty when a laser beam of light is detected within a predetermined time at the cassette detection light receiver 199 after the laser beam of light is emitted from the cassette detection light emitter 198.

The cassette detection members 198 and 199 may determine that the cassette C is present in an accommodation space when a laser beam of light is not detected within a predetermined time at the cassette detection light receiver 199 after the laser beam of light is emitted from the cassette detection light emitter 198.

Figure 19:
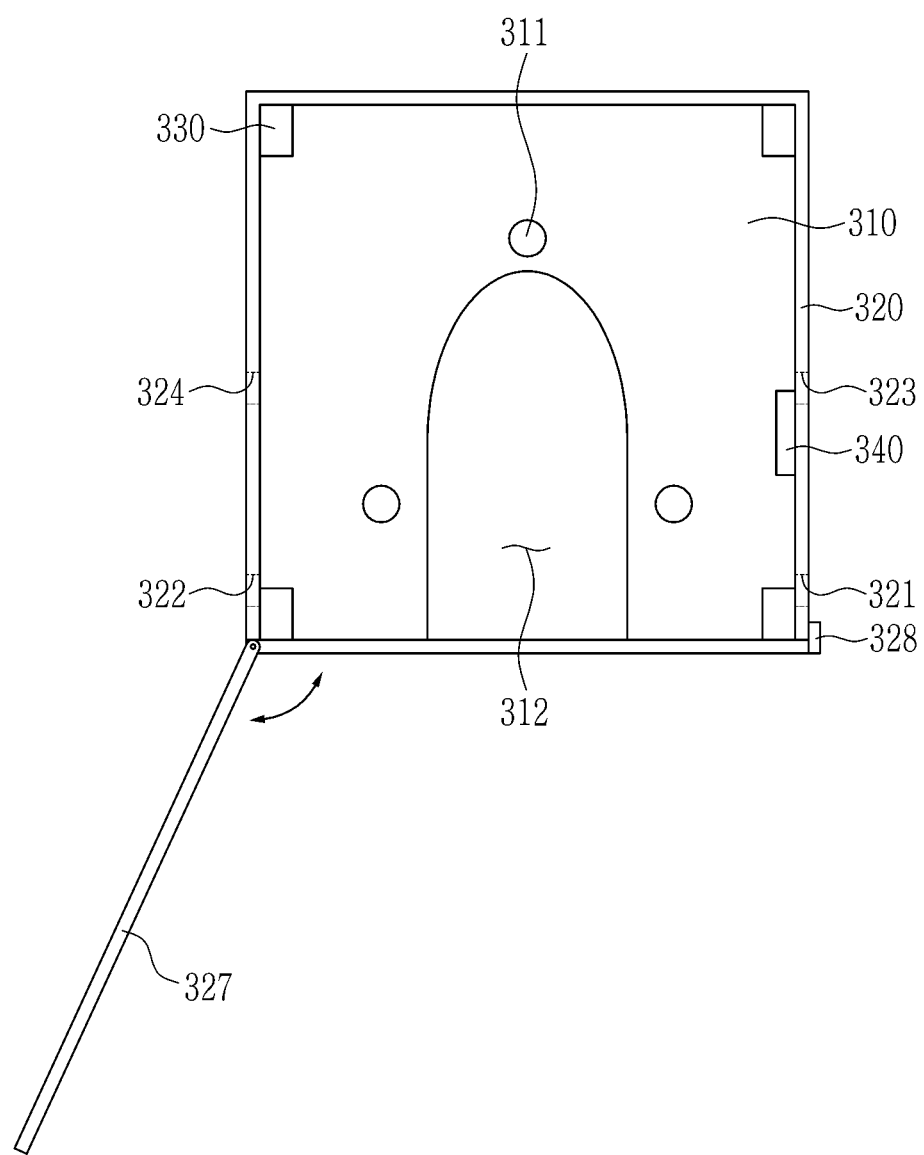
FIG. 19 is a top plan view of a cassette storage case according to another embodiment from top to bottom.

FIG. 19 is a top plan view of a cassette storage case according to another embodiment from top to bottom.

Referring to FIG. 19, a cassette storage case 30 according to another embodiment includes body 310 and 320, a support member 330, and an identification member 340.

The body 310 and 320 has storage space therein where the cassette C is accommodated. The body 310 and 320 has a container structure with opening in an upper portion that faces upward, as illustrated. The body 310 and 320 includes a lower body part 310 and a shield body part 320.

A door 327 is disposed on one side of the shielding body 320. The door 327 is provided to be open and closed, allowing the storage space of the body 310 and 320 to open in a lateral direction intersecting the upward and downward directions. On one side of the door 327 or on one side of the body 310 and 320, a locking member 328 may be disposed that may fix the door 327 to the body 310 and 320.

The saddle alignment opening 312 may be formed through the lower body part 310 up and down. The saddle alignment opening 312 may be formed to be open in the direction in which the door 327 is disposed. Accordingly, when the door 327 is opened, the saddle alignment opening 312 may be connected (i.e., exposed) to the outside in a direction that intersects the upward and downward directions.

The remaining configurations of the body 310 and 320, the support member 330, and the identification member 340 are the same as in the cassette storage case 10 according to an embodiment of FIGS. 2 and 3, so repeated description is omitted.

Further, the condition detection apertures 321 and 322 and the cassette detection apertures 323 and 324 may be the same as the condition detection apertures 121 and 122 and the cassette detection apertures 123 and 124 of the cassette storage case 10 according to an embodiment of FIGS. 2 and 3. Further, the condition detection apertures 321 and 322 and the cassette detection apertures 323 and 324 may be the same as the condition detection apertures 171, 176 and 177 and the cassette detection apertures 173, 178 and 179 according to embodiments of FIGS. 15 and 18.

The cassette storage case 30, according to another embodiment may open the door 327 to allow the side of the body 310 and 320 to be opened. Accordingly, with the cassette storage case 30 loaded from up to down, the operation of carry-in or carry-out of the cassette C into and out of the lower positioned cassette storage case 30 may be performed.

Figure 20:
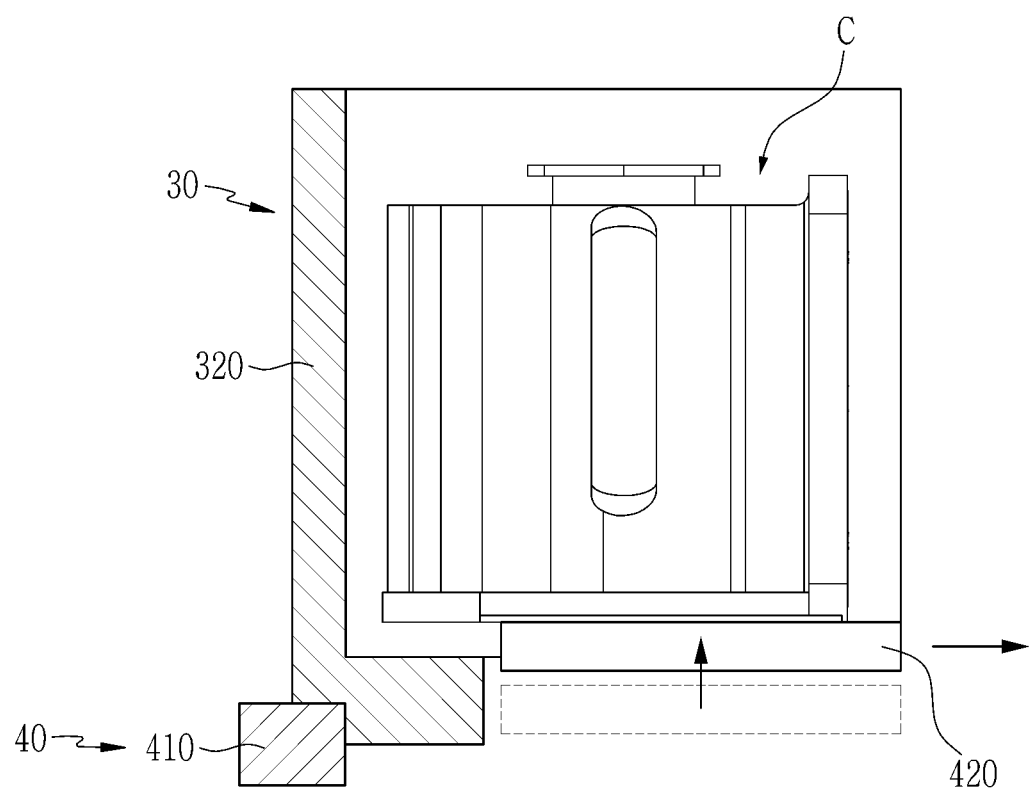
FIG. 20 is a vertical cross-sectional view of the condition of the cassette storage case of FIG. 19 positioned on an interface device according to another embodiment.

FIG. 20 is a vertical cross-sectional view of the condition of the cassette storage case of FIG. 19 positioned on an interface device according to another embodiment.

Referring to FIG. 20, the saddle 420 may be provided to be capable of moving up and down. The saddle 420 may be provided to be movable independent of the alignment port 410, in a direction parallel to the direction of movement of the alignment port 410. Base on a direction intersecting in upward and downward directions, the alignment port 410 may be provided in a structure in which the region positioned in the moving direction of the saddle 420 is opened. Accordingly, the saddle 420 may move between an inner center region of the alignment port 410 and an outer region of the alignment port 410.

When the cassette storage case 30 is positioned in the alignment port 410, the door 327 may be positioned to face the moving direction of the saddle 420. The saddle 420 may rise in a state of being aligned below the cassette C to lift the cassette C. Thereafter, with the door 327 open, the saddle 420 may move to the outer region of the alignment port 410 to carry out the cassette C to the outside of the cassette storage case 30.

The remaining configurations of the interface device 40 are the same as in the interface device 20 according to an embodiment of FIG. 1, so repeated description is omitted.

Figure 21:
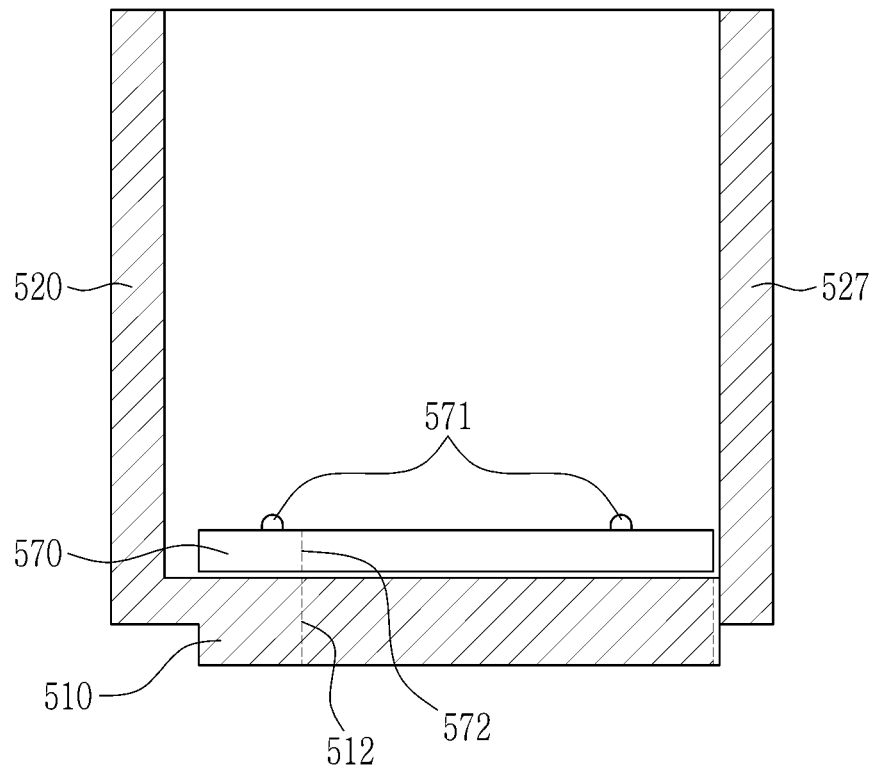
FIG. 21 is a vertical cross-sectional view of a cassette storage case according to an embodiment.
Figure 22:
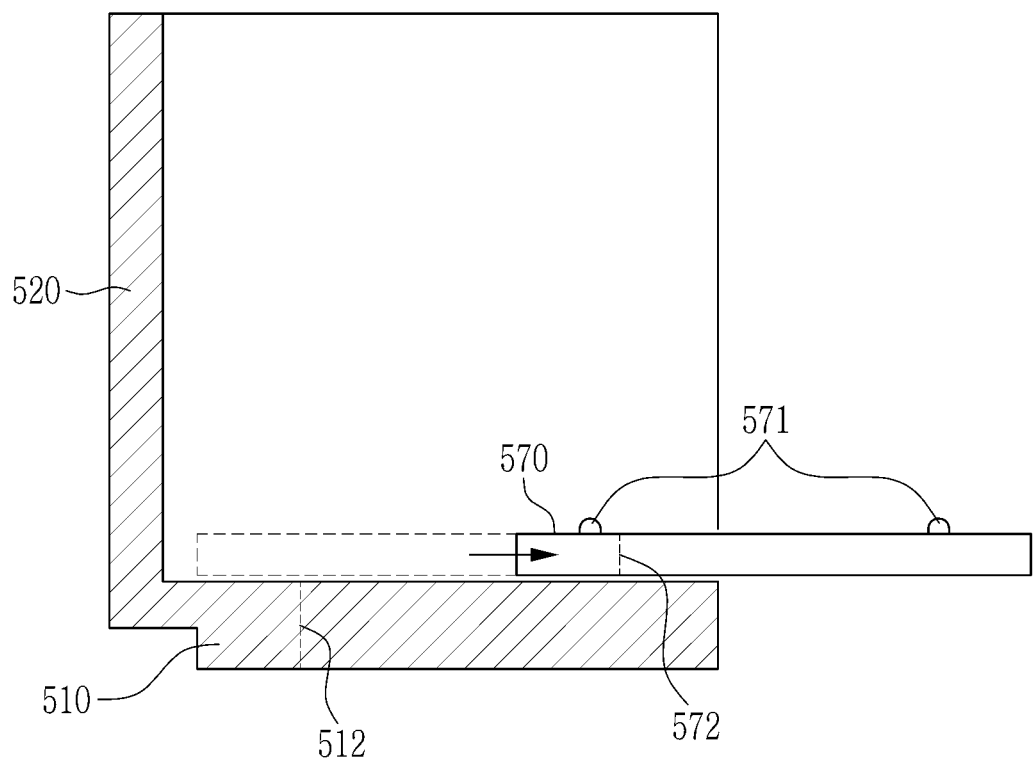
FIG. 22 is a drawing illustrating the condition in which a sliding member is being drawn out from the cassette storage case of FIG. 21.

FIG. 21 is a vertical cross-sectional view of a cassette storage case according to another embodiment. FIG. 22 is a drawing illustrating the condition in which a sliding member is being drawn out from the cassette storage case of FIG. 21.

Referring to FIGS. 21 and 22, body 510 and 520 of a cassette storage case 50, according to another embodiment, have a storage space therein in which the cassette C is accommodated. The body 510 and 520 has a container structure with opening in an upper part thereof that faces upward, as illustrated. The body 510 and 520 includes a lower body part 510 and a shield body part 520.

A door 527 is disposed on one side of the shield body part 520. The door 527 is provided to be opened and closed, allowing the storage space of the body 510 and 520 to open in a lateral direction intersecting the upward and downward directions.

The saddle alignment opening 512 may be formed through the lower body part 510 up and down.

A sliding member 570 is disposed on an upper surface of the lower body part 510. The sliding member 570 may slide with respect to the lower body part 510. The sliding direction of the sliding member 570 is toward the direction in which the door 527 is disposed. At least one alignment protrusion 571 may be disposed on the upper surface of the sliding member 570. An upper saddle alignment opening 572 may be formed through the sliding member 570 up and down. When the sliding member is positioned inside the storage space of the body 510 and 520, the upper saddle alignment opening 572 is aligned up and down with the saddle alignment opening 512.

According to another embodiment of the cassette storage case 50, after the door 527 is opened, the sliding member 571 may be drawn out of the storage space. Accordingly, the operation of inserting or drawing out the cassette C may be more easily performed with the door 527 open.

The remaining configurations of the cassette storage case 50 are the same as in the cassette storage case 30 according to FIG. 19, so repeated description is omitted.

The present invention has been described in connection with what is presently considered to be practical embodiments. Although the embodiments of the present invention have been described, the present invention may also be used in various other combinations, modifications, and environments. In other words, the present invention may be changed or modified within the range of concept of the invention disclosed in the specification, and the range equivalent to the disclosure and/or the range of the technology or knowledge in the field to which the present invention pertains. The embodiments described above have been provided to explain the best state in carrying out the present invention. Therefore, the detailed description of the invention above is not intended to limit the present invention. It is to be understood that other embodiments are also included within the scope of the appended claims.

DESCRIPTION OF SYMBOLS

10: Cassette storage case
20: Interface device

100: Body
110: Lower body part
111: Alignment protrusion
112: Saddle alignment opening
120: Shield body part
121: First condition detection aperture
122: Second condition detection aperture
123: First cassette detection aperture
124: Second cassette detection aperture
130: Support member
140: Identification member
151: Condition detection light emitter
152: Condition detection light receiver
153: Cassette detection light emitter
154: Cassette detection light receiver
160: Code recognition member
210: Alignment port
220: Saddle

What is claimed is:

1. A cassette storage case comprising a body defining an internal storage space for a cassette, wherein
the body comprises:
a lower body part;
a shield body part extending upward from an upper surface outer region of the lower body part, wherein the shield body part has an opening in an upper portion thereof;
a load protruding portion extending outward from a bottom surface of the lower body part, wherein the load protruding portion has a shape that corresponds to a shape of the opening; and
a support member coupled to the upper portion of the shield body part adjacent the opening, wherein the support member has a block shape, wherein the support member is coupled to an inner side surface of the shield body part, and
when the load protruding portion is inserted into an upper part of a body of a second cassette storage case, a side of the load protruding portion is configured to contact an inner side surface of a shield body part of the second cassette storage case or a side of a support member coupled to the inner side surface of the shield body part of the second cassette storage case in at least two locations.

2. The cassette storage case of claim 1, wherein the lower body part has a circular or polygonal shape.

3. The cassette storage case of claim 1, further comprising a plurality of alignment protrusions on the upper surface of the lower body part, and a saddle alignment opening in the lower body part, and wherein at least some regions of the saddle alignment opening are in an inner region of a polygon formed when the plurality of alignment protrusions are connected to each other with an imaginary straight line.

4. The cassette storage case of claim 1, wherein
the body comprises a first condition detection aperture formed through one side of the body; and
a second condition detection aperture formed through an opposite side of the body, wherein the first and second condition detection apertures are positioned to facilitate detecting if the body is in a misaligned position.

5. The cassette storage case of claim 1, wherein
a condition detection aperture is formed through one side of the body, and further comprising
a condition detection reflection member on an inner surface of an opposite side of the body and facing the condition detection aperture, wherein the condition detection reflection member is configured to reflect an incident laser beam of light toward the condition detection aperture.

6. The cassette storage case of claim 1, wherein
a first condition detection aperture is formed through a first side of the body; and
a second condition detection aperture is formed through the first side of the body in adjacent, spaced apart relationship with the first condition detection aperture, and further comprising
a condition detection reflection member on an inner surface of a second side of the body opposite to the first side, wherein the condition reflection member is configured to reflect a laser beam of light incident from the first condition detection aperture toward the second condition detection aperture.

7. The cassette storage case of claim 1, wherein
a first cassette detection aperture is formed through one side of the body; and
a second cassette detection aperture is formed through an opposite side of the body, wherein the first and second cassette detection apertures are positioned to facilitate detecting if a cassette is within the storage space.

8. The cassette storage case of claim 1, wherein
a cassette detection aperture is formed through one side of the body, and further comprising
a cassette detection reflection member on an inner surface of an opposite side of the body facing the cassette detection aperture, wherein the cassette detection reflection member is configured to reflect an incident laser beam of light toward the cassette detection aperture.

9. The cassette storage case of claim 1, wherein
a first cassette detection aperture is formed through a first side of the body; and
a second cassette detection aperture is formed through the first side of the body in adjacent, spaced apart relationship with the first cassette detection aperture, and further comprising
a cassette detection reflection member on an inner surface of a second side of the body opposite to the first side, wherein the cassette detection reflection member is configured to reflect a laser beam of light incident from the first cassette detection aperture toward the second cassette detection aperture.

10. The cassette storage case of claim 1, wherein
at least one alignment protrusion is on the upper surface of the lower body part.

11. The cassette storage case of claim 1, wherein
a saddle alignment opening is formed through the lower body part.

12. The cassette storage case of claim 1, further comprising
an identification member on one side of the body, wherein the identification member comprises a unique identification code.

13. The cassette storage case of claim 1, further comprising
a door on one side of the shield body part.

14. A cassette storage case, comprising:
a body defining an internal storage space for a cassette, wherein the body comprises a lower body part, and a shield body part extending upward from an upper surface outer region of the lower body part, wherein the shield body part has an opening in an upper portion thereof; and a support member coupled to an inner surface of the upper part of the shield body part adjacent the opening, wherein the support member has a block shape, a load protruding portion extending outward from an outer bottom surface of the lower body part, wherein the load protruding portion has a shape that corresponds to a shape of the opening, and at least one detection aperture formed through one side of the body.

15. A cassette management system, comprising:

a cassette storage case comprising a body defining an internal storage space for a cassette; and an interface device configured to receive the cassette storage case, wherein the body comprises:

a lower body part;

a shield body part extending upward from an upper surface outer region of the lower body part, wherein the shield body part has an opening in an upper portion thereof;

a load protruding portion extending outward from an outer bottom surface of the lower body part, wherein the load protruding portion has a shape that corresponds to a shape of the opening;

a support member coupled to an inner surface of the upper part of the shield body part adjacent the opening, wherein the support member has a block shape; and at least one detection aperture formed through one side of the body.

16. The cassette management system of claim 15, wherein the interface device comprises:

a frame; and an alignment port at an upper part of the frame, wherein the alignment port is configured to receive the lower body part of the cassette storage case.

17. The cassette management system of claim 16, wherein the interface device further comprises:

a saddle in an inner center region of the alignment port, and a saddle alignment opening formed through the lower body part, wherein the saddle alignment opening is configured to receive an upper part of the saddle therein.

18. The cassette management system of claim 17, wherein the saddle is configured to move up and down.

19. The cassette management system of claim 17, wherein the interface device further comprises:

a cassette position detection sensor on an upper surface of the saddle.

* * * * *